(12) United States Patent
Li et al.

(10) Patent No.: US 7,226,083 B2
(45) Date of Patent: Jun. 5, 2007

(54) COLLAPSIBLE STEERING COLUMN ASSEMBLY

(75) Inventors: Xiaoyu Li, Saginaw, MI (US); Richard K. Riefe, Saginaw, MI (US); Rick P. Nash, Frankenmuth, MI (US)

(73) Assignee: Delphi Technologies, Inc., Troy, MI (US)

( * ) Notice: Subject to any disclaimer, the term of this patent is extended or adjusted under 35 U.S.C. 154(b) by 384 days.

(21) Appl. No.: 10/787,426

(22) Filed: Feb. 26, 2004

(65) Prior Publication Data
US 2005/0189757 A1    Sep. 1, 2005

(51) Int. Cl.
*B62D 1/19* (2006.01)
(52) U.S. Cl. .................................. 280/777
(58) Field of Classification Search .......... 74/493; 280/777; B62D 1/19
See application file for complete search history.

(56) References Cited

U.S. PATENT DOCUMENTS

| | | | |
|---|---|---|---|
| 4,533,962 A | 8/1985 | Decker et al. | |
| 4,886,295 A | 12/1989 | Browne | |
| 5,286,056 A | 2/1994 | Speich | |
| 5,562,307 A | 10/1996 | Connor | |
| 5,618,058 A | 4/1997 | Byon | |
| 5,788,278 A | 8/1998 | Thomas et al. | |
| 6,170,874 B1 | 1/2001 | Fosse | |
| 6,189,929 B1 | 2/2001 | Struble et al. | |
| 6,234,528 B1 | 5/2001 | Ben-Rhouma et al. | |
| 6,279,952 B1 | 8/2001 | Van Wynsberghe et al. | |
| 6,322,103 B1 | 11/2001 | Li et al. | |
| 6,439,607 B1 * | 8/2002 | Jurik et al. | 280/777 |
| 6,575,497 B1 | 6/2003 | McCarthy et al. | |
| 6,578,872 B2 * | 6/2003 | Duval et al. | 280/777 |
| 6,652,002 B2 | 11/2003 | Li et al. | |
| 6,769,715 B2 * | 8/2004 | Riefe et al. | 280/777 |
| 6,877,775 B2 * | 4/2005 | Manwaring et al. | 280/777 |
| 2002/0036404 A1 | 3/2002 | Li et al. | |
| 2002/0167157 A1 * | 11/2002 | Matsumoto et al. | 280/777 |
| 2003/0975913 | 4/2003 | Li et al. | |
| 2003/0102658 A1 | 6/2003 | McCarthy et al. | |
| 2004/0211612 A1 * | 10/2004 | Muller | 180/271 |

FOREIGN PATENT DOCUMENTS

| | | |
|---|---|---|
| EP | 0598857 B1 | 11/1996 |
| EP | 0772541 B1 | 5/1998 |
| EP | 1288103 | 3/2003 |
| JP | 52048774 | 4/1977 |

* cited by examiner

*Primary Examiner*—Ruth Ilan
(74) *Attorney, Agent, or Firm*—Michael D. Smith

(57) ABSTRACT

The subject invention provides a collapsible steering column assembly. The assembly includes a support for attachment to a vehicle. A steering column is movably supported by the support. An energy absorbing mechanism interconnects the steering column and the support for absorbing energy in response to the steering column moving relative to the support during a collision. The energy absorbing mechanism includes a elongated element and a brake for variably resisting the movement of the elongated element and absorbing the energy during the collision. The elongated element, in combination with the brake, is capable of adjustment to absorb energy at forces of various magnitude such that a universal energy absorbing device may be installed on each type of vehicle. Furthermore, the elongated element retains structural integrity after absorbing the energy and need not be replaced.

16 Claims, 3 Drawing Sheets

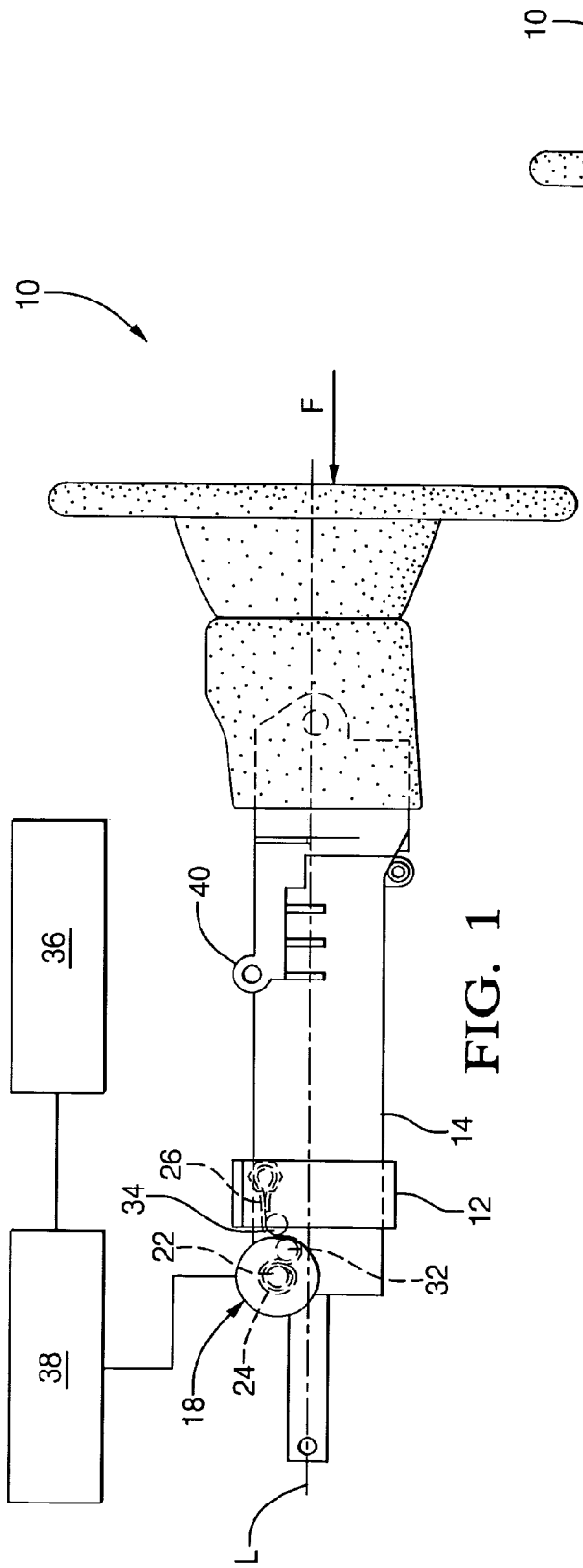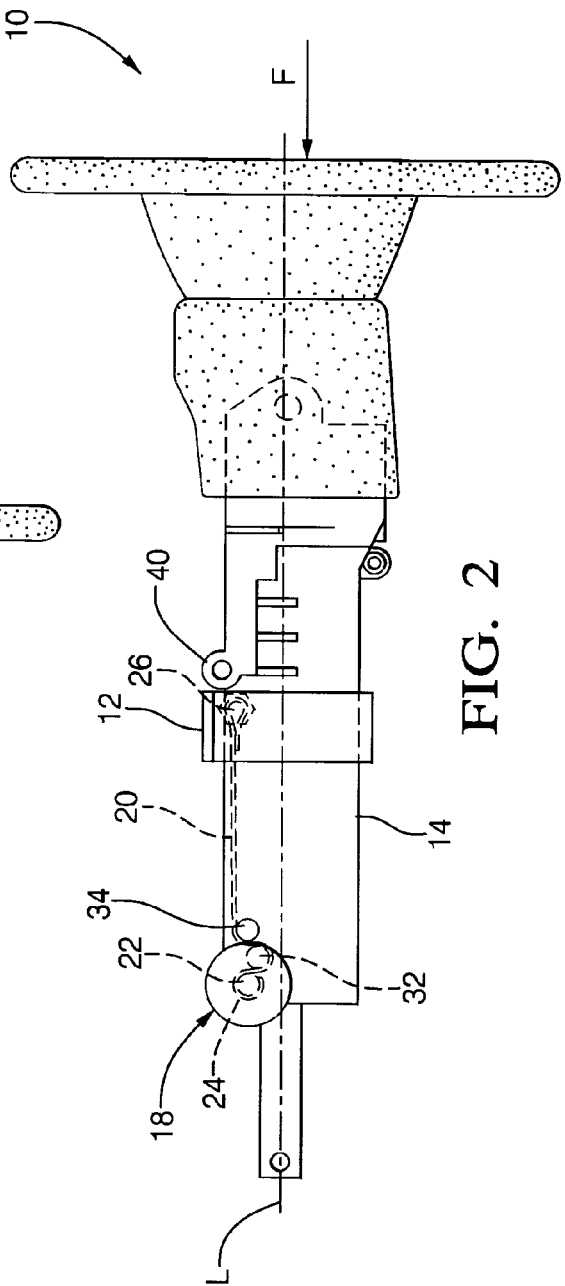

COLLAPSIBLE STEERING COLUMN ASSEMBLY

FIELD OF THE INVENTION

The subject invention relates to a collapsible steering column assembly including an energy absorbing mechanism.

BACKGROUND OF THE INVENTION

Collapsible steering column assemblies are known in the art for including in vehicles to reduce the likelihood of injury to occupants of the vehicles during collisions. The steering column assemblies include a support for attachment to the vehicle. A steering column is movably supported by the support. An energy absorbing mechanism interconnects the steering column and the support for absorbing energy in response to the steering column moving relative to the support, i.e., when a force is exerted on the steering column such as during the collision.

Common energy absorbing mechanisms include a metal strap that is wrapped about an anvil. The metal strap is generally fixed to the steering column and the anvil is fixed to the support. During the collisions, when the force is exerted on the steering column, the metal strap is forced about the anvil. The metal strap resists the movement and bends about the anvil, thus absorbing the energy and allowing the steering column to move in relation to the support. One of the problems with the energy absorbing mechanisms is that the metal straps are selected to deform when a force exerted on the steering column exceeds a predetermined threshold. As a result, the energy absorbing mechanism is exhausted after absorbing the energy when the force exceeds the threshold and cannot absorb additional energy thereafter. For example, during the collision, the force of the collision itself may exceed the predetermined threshold. In the event that the occupant impacts the steering column shortly thereafter, the energy absorbing mechanism cannot absorb any more energy. Furthermore, collisions generate forces of various magnitude on the steering column, depending on the speed of the vehicles involved, among other variables. The metal straps, chosen to deform at the predetermined threshold, are not suitable to absorb energy at forces below or substantially above the predetermined threshold. In other words, the metal straps, because of the predetermined threshold, are based on predetermined collision conditions and cannot adjust to actual collision conditions. In addition, the metal straps, once deformed, lose structural integrity and must be replaced.

Thus, there is an opportunity to provide an energy absorbing mechanism that is capable of adjustment to absorb energy at forces of various magnitude such that a universal energy absorbing device may be installed on each type of vehicle and adjusted based on individual parameters of the vehicle.

SUMMARY OF THE INVENTION AND ADVANTAGES

The subject invention provides a collapsible steering column assembly including a support for attachment to a vehicle. A steering column is movably supported by the support. An energy absorbing mechanism interconnects the steering column and the support for absorbing energy in response to the steering column moving relative to the support during a collision. The energy absorbing mechanism includes an elongated element movable along a longitudinal axis in response to the movement of the steering column. The energy absorbing mechanism further includes a brake for variably resisting the movement of the elongated element.

The elongated element, in combination with the brake, is capable of adjustment to absorb energy at forces of various magnitude such that a universal energy absorbing device may be installed on each type of vehicle and adjusted based on individual parameters of the vehicle.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a schematic side view of a collapsible steering column assembly including an energy absorbing mechanism prior to collapse of the assembly;

FIG. 2 is another schematic side view of the collapsible steering column assembly of FIG. 1 subsequent to collapse of the assembly;

DETAILED DESCRIPTION OF THE PREFERRED EMBODIMENT

Referring to the Figures, wherein like numerals indicate like or corresponding parts throughout the several views, a collapsible steering column assembly is shown at 10 in FIG. 1. The assembly 10 is included in a vehicle for collapsing to minimize injury to occupants of the vehicle during a collision.

Figure 3:
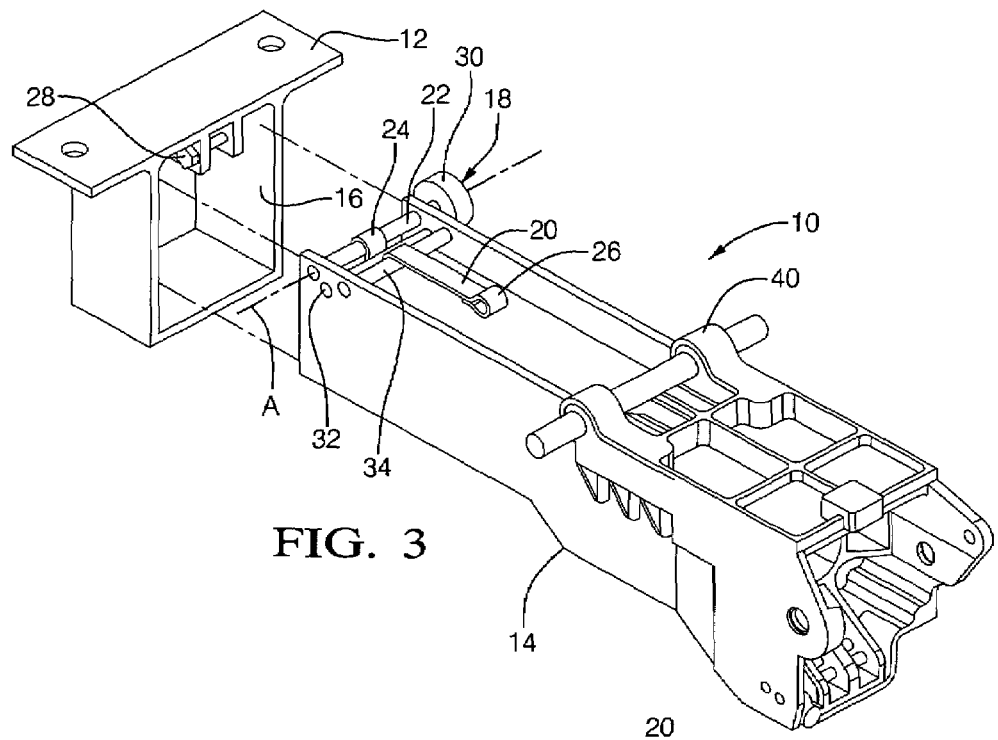
FIG. 3 is a partially exploded view of the assembly of FIG. 1.

The collapsible steering column assembly 10 includes a support 12 for attachment to a vehicle. A steering column 14 is movably supported by the support 12. As best shown in FIG. 3, the support 12 includes a frame 16 for receiving the steering column 14. The frame 16 defines a shape corresponding to a shape of the steering column 14. More specifically, the steering column 14 preferably defines a box-shaped cross-section in a plane perpendicular to a longitudinal axis L of the steering column 14. The steering column 14 is movable through the frame 16 along the longitudinal axis L. The shape of the frame 16 corresponds to the shape of the cross-section for guiding the steering column 14 as the steering column 14 moves through the frame 16. Alternatively, the steering column 14 defines the cross-section in any variety of shapes including circular, triangular, etc.

Preferably, at least one shear capsule (not shown) is disposed between the vehicle and the steering column 14 for immobilizing the steering column 14 during normal driving conditions. During a collision, forces between the steering column 14 and the vehicle cause the shear capsule to rupture, thus releasing the steering column 14 from the immobilized position.

An energy absorbing mechanism 18 interconnects the steering column 14 and the support 12. It is to be appreciated that the energy absorbing mechanism 18 may interconnect the steering column 14 and any part of the vehicle adjacent to and fixed with respect to the steering column 14. The energy absorbing mechanism 18 absorbs energy in response to the steering column 14 moving relative to the support 12 during a collision.

The energy absorbing mechanism 18 includes a elongated element 20 that is movable along a longitudinal axis L in response to the movement of the steering column 14. The energy absorbing mechanism 18 further includes a brake 30 for variably resisting the movement of the elongated element 20 and absorbing the energy during the collision. By variably resisting, it is meant that the brake 30 absorbs energy at forces of various magnitude. Thus, one of the advantages of the subject invention is that the elongated element 20 is sufficiently flexible to provide insubstantial resistance to bending and, in combination with the brake 30, is capable of adjustment to absorb energy at forces of various magnitude such that a universal energy absorbing device may be installed on each type of vehicle and adjusted based on individual parameters of the vehicle. Preferably, the elongated element 20 retains structural integrity after absorbing the energy so that the energy absorbing mechanism 18 may be returned to a pre-collision condition after absorbing the energy. Preferably, the elongated element 20 is a metal strap made of steel, but may also be made of a woven fabric, such as nylon, or any other type of material so long as the energy absorbing mechanism 18 is capable of absorbing the energy without the elongated element 20 snapping or breaking. More specifically, the elongated element 20 must be able to withstand forces of at least 300 lbs of force. In a preferred embodiment, the elongated element 20 is able to withstand forces of at least 1200 lbs of force. In addition, the elongated element 20 may have a variety of shapes. Preferably, the elongated element 20 is flat and relatively wide, having a belt or strap shape similar to that of a seat belt strap. In another embodiment (not shown), the elongated element 20 is cable-like and has a circular cross-sectional shape. The flexible feature of the elongated element 20 means that the elongated element 20 offers negligible or no resistance to bending and merely transmits forces in tension, i.e., there is no energy absorption due to bending forces.

Figure 4:
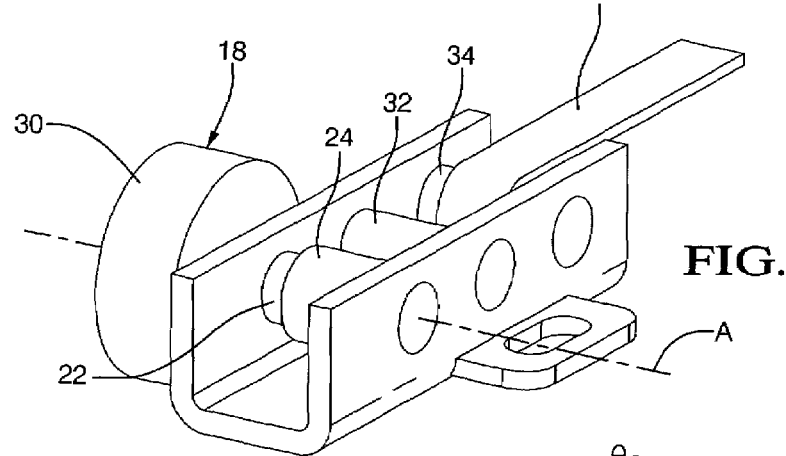
FIG. 4 is a perspective view of a portion of a support including another embodiment of an energy absorbing mechanism.
Figure 6:
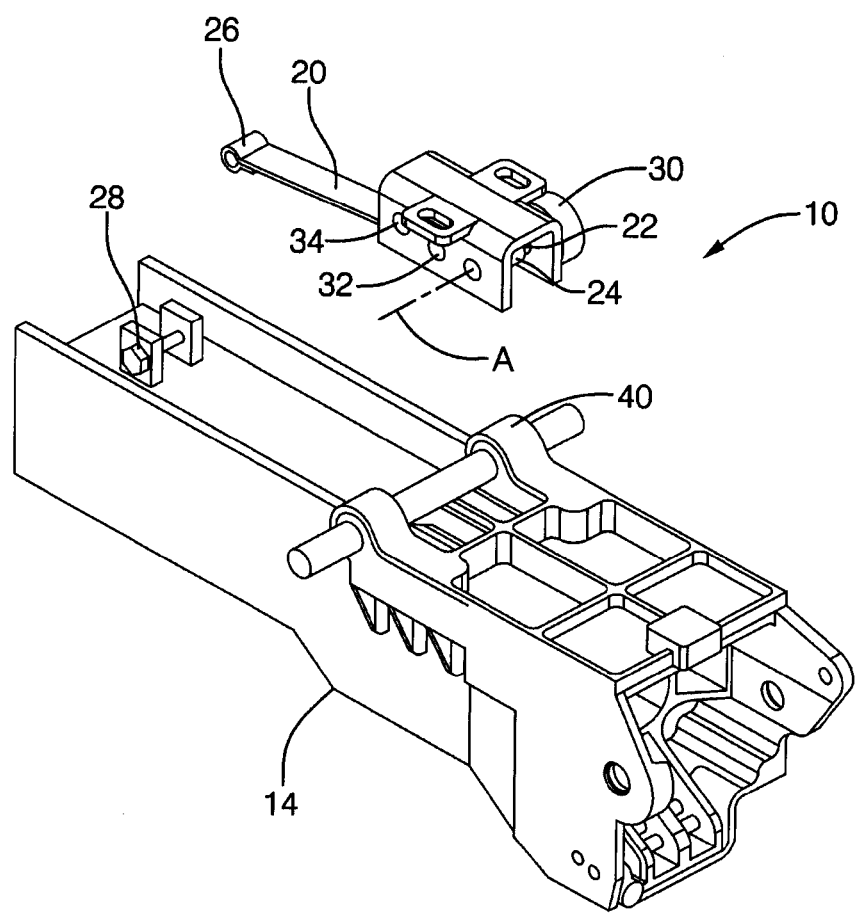
FIG. 6 is a partially exploded view of another assembly of the present invention.

In one embodiment, the energy absorbing mechanism 18 includes a roller 22 rotatable about an axis A. Preferably, the axis A is transverse to the longitudinal axis L of the steering column 14. The elongated element 20 has a first end 24 wound about the roller 22 for unwinding and rotating the roller 22 about the axis A in response to the movement of the steering column 14 relative to the support 12. In a preferred embodiment, as shown in FIG. 3, the roller 22 is rotatably supported by the steering column 14. The elongated element 20 has a second end 26 fixed to the support 12. More specifically, the elongated element 20 includes a loop at the second end 26. The support 12 includes a fastener 28 for extending through the loop and fixing the second end 26 of the elongated element 20 to the support 12. However, it is to be appreciated that the second end 26 of the elongated element 20 may be fixed to any other part of the vehicle adjacent to and fixed with respect to the steering column 14. In addition, the second end 26 of the elongated element 20 may be fixed through a variety of mechanisms as are known in the art. In an alternative embodiment, as shown in FIG. 4, the roller 22 is rotatably supported by the support 12. FIG. 6 further illustrates the roller 22 in proximity to the steering column 14 wherein the roller 22 would be rotatably supported by the support 12. It should be appreciated that with the roller 22 being supported by the support 12, the fastener 28 will in turn be mounted to the steering column 14 as shown. Likewise, the roller 22 may be rotatably supported by any other part of the vehicle adjacent to and fixed with respect to the steering column 14. The second end 26 of the elongated element 20 is fixed to the steering column 14. The second end 26 of the elongated element 20 may be fixed through a variety of mechanisms as are known in the art.

In one embodiment, the brake 30 resists the rotational movement of the roller 22 in response to the movement of the steering column 14 relative to the support 12. Preferably, the brake 30 is a magnetic particle brake, which is controlled by electrical signals. However, it is to be appreciated that the brake 30 may be of any variety for resisting the rotational movement of the roller 22. In another embodiment, not shown, the brake sandwiches or otherwise frictionally engages the elongated element 20. The brake 30 is disposed adjacent to the first end 24 of the elongated element 20. It is to be appreciated that the brake 30 need not include the roller 22, wherein the first end 24 of the elongated element 20 may extend for a length beyond the brake.

Figure 5:
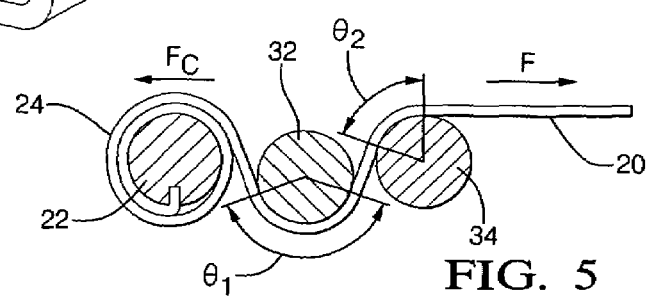
FIG. 5 is a side view of a portion of the energy absorbing mechanism.

The brake 30 provides a control force $F_c$ on the elongated element 20, i.e., a grabbing force. Preferably, the brake 30 is operable to provide a minimum resistance such that the steering column 14 remains stable during normal operating conditions. In one embodiment, the control force $F_c$ provided from the brake 30 itself is sufficient to resist the movement of the elongated element 20 and absorb the energy during the collision. In another embodiment, the steering column assembly 10 further includes at least one frictional member 32 in frictional engagement with the elongated element 20. The frictional member 32 is disposed along the elongated element 20 between the first end 24 and the second end 26. The frictional member 32 frictionally resists the movement of the elongated element 20 and adds to the resistance to movement of the elongated element 20 from the brake 30. Thus, the frictional member 32 reduces the control force $F_c$ required from the brake 30. The frictional resistance depends upon a wrap angle $\theta_1$ of the elongated element 20 about the frictional member 32, which relates to a contact surface area between the elongated element 20 and the frictional member 32, and a coefficient of friction between the elongated element 20 and the frictional member 32. Preferably, as shown in FIG. 5, the elongated element 20 wraps about the frictional member 32 at an angle of from ninety to one-hundred and eighty degrees. Preferably, the coefficient of friction is up to 0.8. More preferably, the coefficient of friction is between 0.25 and 0.5. The wrap angle $\theta_1$, the coefficient of friction, and the control force $F_c$ provided from the brake 30 are adjusted for absorbing the energy. In a preferred embodiment, the coefficient of friction and the wrap angle $\theta_1$ are fixed, and the control force $F_c$ provided from the brake 30 is variable. For example, during a collision, the steering column 14 moves relative to the support 12, which in turn moves the elongated element 20. The brake 30 provides the control force $F_c$ which, as described below, is variable depending on a magnitude of force F from the movement of the steering column 14, while the friction between the frictional member 32 and the elongated element 20 further resists the movement of the elongated element 20.

Preferably, the energy absorbing mechanism 18 includes the roller 22 in addition to the frictional member 32. The frictional member 32 is adjacent and fixed in relation to the roller 22. The brake 30 engages the roller 22 for providing the control force $F_c$ and resisting rotational movement of the roller 22 in response to the movement of the steering column 14 relative to the support 12. In a preferred embodiment, the energy absorbing mechanism 18 includes the roller 22 and at least two frictional members 32, 34 in frictional engagement with the elongated element 20 for increasing the frictional resistance to the movement of the elongated element 20. The frictional members 32, 34 are adjacent and fixed with respect to the roller 22. The additional frictional member 34 exponentially increases the frictional resistance to the movement of the elongated element 20. Thus, the additional frictional member 34 corresponds to less control force $F_c$ required from the brake 30.

In one embodiment, as shown in FIG. 3, the frictional members 32, 34 may be offset from each other. In another embodiment, as shown in FIG. 4, the frictional members 32, 34 are disposed along a common plane. The position of the frictional members 32, 34 is adjusted to vary the wrap angle $\theta_1$, $\theta_2$ of the elongated element 20 about the frictional members 32, 34. Preferably, the plane is substantially parallel with the longitudinal axis L of the steering column 14. In addition, the control force $F_c$ is preferably provided in a direction parallel to the direction of movement of the steering column 14.

Preferably, as shown in FIG. 1, the collapsible steering column assembly 10 includes a computer system for variably controlling the frictional resistance provided from the brake 30. Preferably, the computer system is disposed at a remote location from the collapsible steering column assembly 10. In a preferred embodiment, the computer system is a body computer of the vehicle that controls other functions of the vehicle as well, such as air bag deployment, and is modified to control the frictional resistance provided from the brake 30.

The computer system comprises a sensor 36 for sensing the collision and generating signals based on a magnitude of force F on the steering column 14 during the collision. The computer system further includes a processor 38 for receiving the signals from the sensor 36 and controlling the frictional resistance of the brake 30 based on the signals. More specifically, the processor 38 controls the control force $F_c$ provided from the brake 30. To tune the brake 30, a series of forces are exerted on the steering column 14. The sensor 36 senses the forces and generates a spectrum of signals relating to the forces. The processor 38 then relates the signals from the sensor 36 to electrical signals for controlling the brake 30. The signals are tuned such that the control force $F_c$ provided from the brake 30, in combination with the frictional resistance provided from the frictional members 32, 34, substantially resists the movement of the elongated element 20 as the steering column 14 moves relative to the support 12. Thus, the brake 30, in combination with the computer system and the elongated element 20, is capable of variably absorbing energy from the movement of the steering column.

In a preferred embodiment, the computer system controls the control force $F_c$ provided from the brake 30 in real time. For example, the collapsible steering column assembly 10 is ordinarily in a non-collapsed position as shown in FIG. 1. A first force is exerted on the steering column 14 resulting from the collision between the vehicle and another object. Based on the signals from the sensor 36, the processor 38 controls the control force $F_c$ provided from the brake 30 to resist the movement of the elongated element 20 and absorb the energy during the collision. Preferably, a minimum control force $F_c$ of 300 lbs of force is provided from the brake 30, and in order for the steering column 14 to move, the first force must be at least 300 lbs. The minimum control force $F_c$ of 300 pounds force prevents movement of the steering column 14 notwithstanding a collision. Preferably, the brake 30 absorbs the energy from the first force and prevents the steering column 14 from fully collapsing, i.e., collapsing to a position as shown in FIG. 2 wherein the support 12 abuts a protruding portion 40 of the steering column 14. Thus, the brake 30 is capable of absorbing energy from a second force after absorbing the energy from the first force. The second force may result from a collateral vehicle collision or from an occupant of the vehicle impacting the steering column 14. The brake 30 provides the control force $F_c$, and the brake 30 absorbs the energy from the second force, thus minimizing injury to the occupant. However, it is to be appreciated that the brake 30 may be capable of absorbing additional forces after the first and second forces so long as the steering column 14 is prevented from fully collapsing.

While the invention has been described with reference to an exemplary embodiment, it will be understood by those skilled in the art that various changes may be made and equivalents may be substituted for elements thereof without departing from the scope of the invention. In addition, any modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A collapsible steering column assembly comprising;
a support for attachment to a vehicle,
a steering column movably supported by said support, and
an energy absorbing mechanism interconnecting said steering column and said support for absorbing energy in response to said steering column moving relative to said support during a collision,
said energy absorbing mechanism including an elongated element movable along a longitudinal axis in response to the movement of said steering column and a brake for variably resisting the movement of said elongated element;
at least one frictional member in frictional engagement with said elongated element for frictionally resisting the movement of said elongated element and for adding to the resistance to movement of said elongated element by said brake; and
wherein said elongated element is sufficiently flexible to provide insubstantial resistance to bending for allowing frictional engagement with said frictional member while retaining structural integrity for returning to a pre-collision condition.

2. An assembly as set forth in claim 1 wherein said brake is operable to provide a minimum resistance for stabilizing said steering column during normal operating conditions.

3. An assembly as set forth in claim 1 wherein said brake in combination with said frictional member is operable to prevent movement of said elongated element until 300 lbs of force is applied to said elongated element.

4. An assembly as set forth in claim 3 further comprising a computer system connected to said brake for controlling the resistance provided by said brake.

5. An assembly as set forth in claim 4 wherein said computer system comprises a sensor for sensing the collision and generating signals based on a magnitude of force on said steering column during the collision.

6. An assembly as set forth in claim 5 wherein said computer system further comprises a processor for receiving the signals from said sensor and controlling the variable resistance of said brake based on the signals.

7. An assembly as set forth in claim 1 further comprising a computer system.

8. An assembly as set forth in claim 7 wherein said computer system comprises a sensor for sensing the collision and generating signals based on a magnitude of force on said steering column during the collision.

9. An assembly as set forth in claim 8 wherein said computer system further comprises a processor for receiving the signals from said sensor and controlling the variable resistance of said brake based on the signals.

10. An assembly as set forth in claim 1 wherein said energy absorbing mechanism further comprises a roller rotatable about an axis A.

11. An assembly as set forth in claim 10 wherein said elongated element has a first end wound about said roller for unwinding and rotating said roller in response to the movement of said steering column relative to said support.

12. An assembly as set forth in claim 11 wherein said brake resists rotational movement of said roller in response to the movement of said steering column relative to said support.

13. An assembly as set forth in claim 10 wherein said roller is rotatably supported by said steering column.

14. An assembly as set forth in claim 13 wherein said elongated element has a second end fixed to said support.

15. An assembly as set forth in claim 10 wherein said roller is rotatably supported by said support.

16. An assembly as set forth in claim 15 wherein said elongated element has a second end fixed to said steering column.

* * * * *